4 Sheets--Sheet 1.

ADELIA E. & E. P. BALL.

Machines for Stamping Ores.

No. 5,865. Reissued May 12, 1874

J. A. Curtis, Atty, for
Adelia Ball, and
Edwin P. Ball,
Administrators of
William Ball, Inventor.

Witnesses,
C. E. Buckland.
J. P. Watt

4 Sheets--Sheet 2.

ADELIA E. & E. P. BALL.

Machines for Stamping Ores.

No. 5,865. Reissued May 12, 1874

J. A. Curtis, Atty. for Adelia Ball, and Edwin P. Ball, Administrators of William Ball, Inventor, Witnesses,
C. E. Buckland,
J. P. Wall 4 Sheets--Sheet 3.

ADELIA E. & E. P. BALL.

Machines for Stamping Ores.

No. 5,865. Reissued May 12, 1874

J. A. Curtis, Atty. for Adelia Ball, and Edwin P. Ball, Administrators of William Ball, Inventor.

Witnesses.
C. E. Buckland.
J. L. Wall

4 Sheets--Sheet 4.
ADELIA E. & E. P. BALL.
Machines for Stamping Ores.
No. 5,865. Reissued May 12, 1874
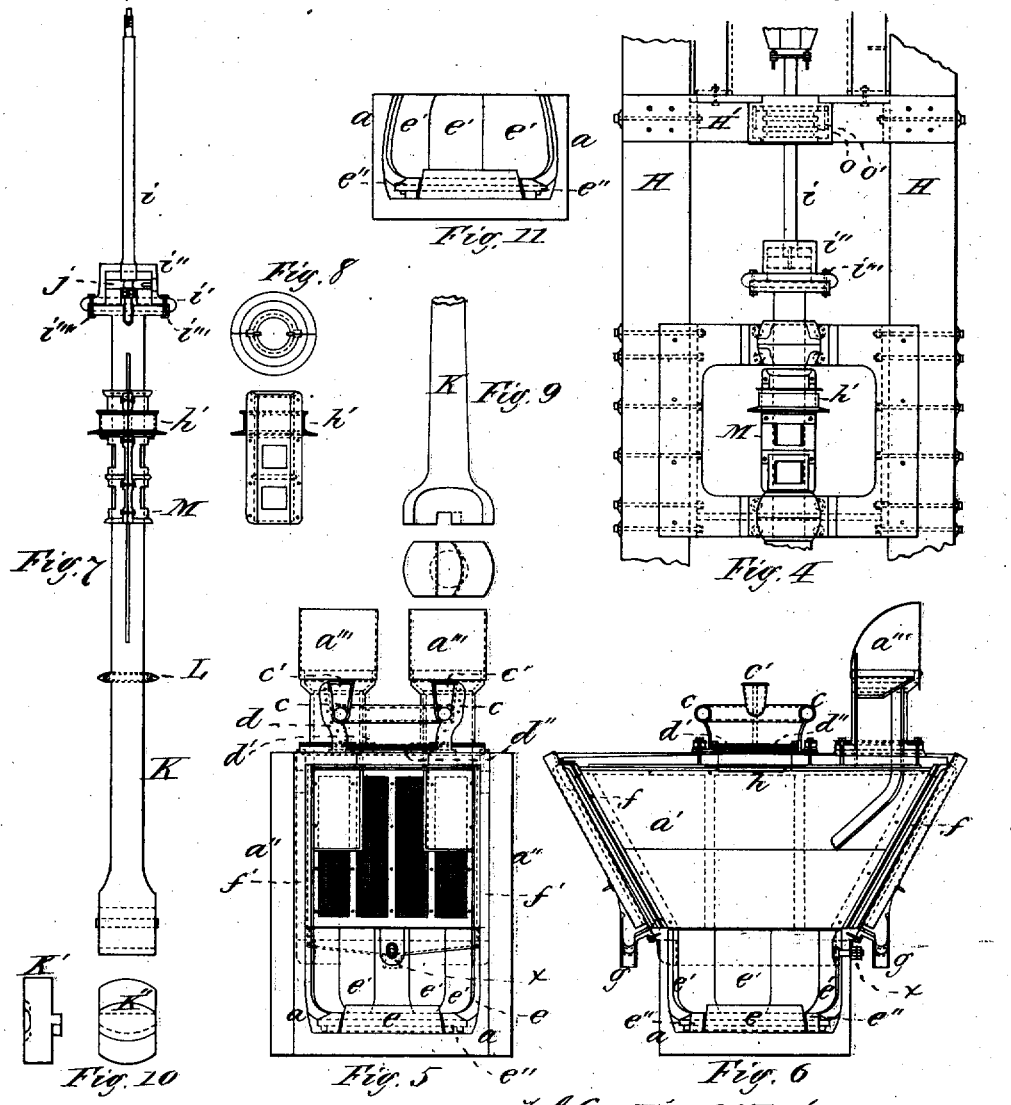
T. A. Curtis, atty for Adelia Ball, and Edwin P. Ball, Administrator of William Ball, Inventor.
Witnesses,
C. E. Buckland.
J. P. Ball

241. SOLID MATERIAL COMMINUTION
69 OR DISINTEGRATION

Search Roo

BEST AVAILABLE COPY

UNITED STATES PATENT OFFICE.

ADELIA E. BALL AND EDWIN P. BALL, OF CHICOPEE, MASSACHUSETTS, ADMINISTRATORS OF WILLIAM BALL, DECEASED.

IMPROVEMENT IN MACHINES FOR STAMPING ORES.

Specification forming part of Letters Patent No. 72,715, dated December 31, 1867; reissue No. 5,865, dated May 12, 1874; application filed February 11, 1874.

*To all whom it may concern:*

Be it known that WILLIAM BALL, late of Chicopee, county of Hampden, State of Massachusetts, did invent certain new and useful Improvements in Machines for Stamping Ores or Mineral Rock, &c.; and that the following is a full, clear, and exact description of the same, reference being had to the accompanying drawings making a part of this specification, in which—

Figure 1:
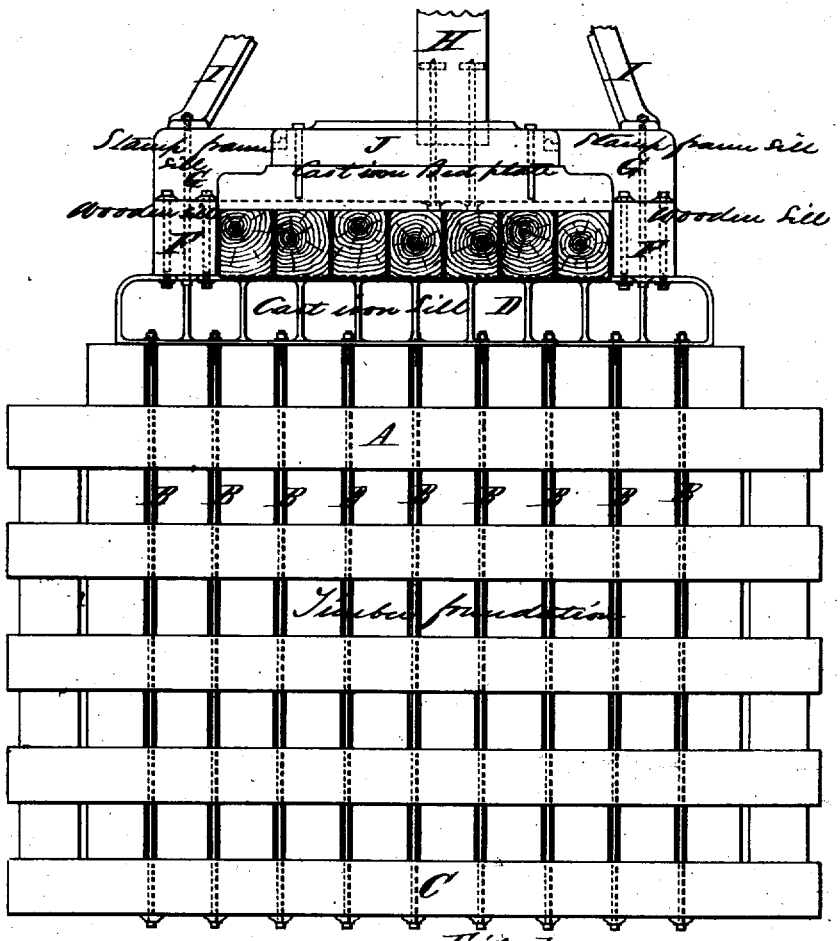
Figure 2:
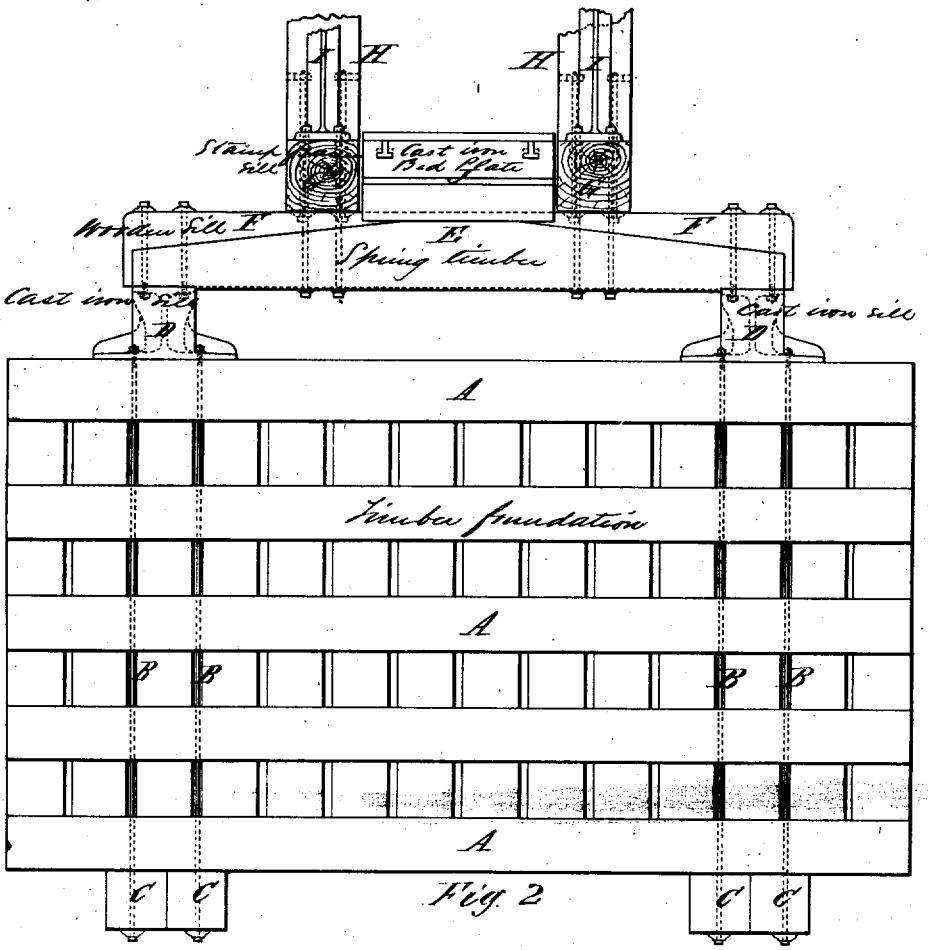
Figure 3:
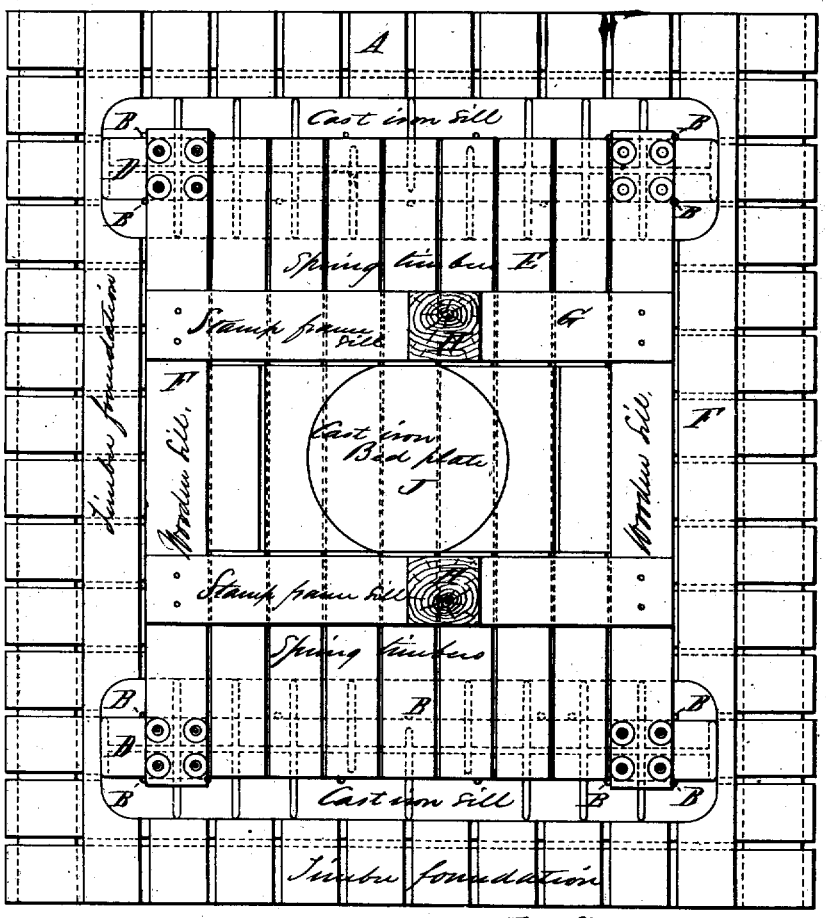

Figure 1 is a side elevation, showing the construction of the foundation and portion of the frame-work. Fig. 2 is an end elevation of the same. Fig. 3 is a plan of the bed-plate and foundation-work. Fig. 4 is a front elevation of a double and single beam which connect the perpendicular posts, and through or in which the steam piston-rod and the stamp-shaft are secured and work. Fig. 5 is a transverse vertical section of the mortar-box and mortar. Fig. 6 is a longitudinal vertical section of the same. Fig. 7 is a part elevation and part vertical section of the stamp-shaft. Fig. 8 is a plan and side view of detached portions of the stamp-shaft. Fig. 9 is a reverse plan view of an elevation of the lower end of the stamp-shaft. Fig. 10 is a plan and side view of the hammer-head. Fig. 11 is a transverse vertical section of the mortar.

In Figs. 1, 2, and 3, A is a timber foundation bedded in the ground, each successive tier of which is placed transversely to the one below it, one tier upon the other, and at a little distance apart, so that apertures will be made in their angles from top to bottom through the several tiers, through which apertures bolts B are inserted, the lower ends through the girders C, and the upper ends through the lower flange of the cast-iron sill D. By means of these bolts the whole structure or foundation of the timbers is bound firmly together, and the interstices, when bedded in the ground, are filled with grout, thus rendering the foundation solid and firm. The sill D is made of metal, in order to produce a broader base and greater solidity than can be conveniently obtained in one piece of timber, for the purpose of affording a broader surface-bearing upon and across the ends of the sills A, the base bearing-surface of which sill D is about three feet wide. Ordinarily good sound timber cannot be obtained which will square up over eighteen inches, which, of course, will cover only eighteen inches bearing-surface, and the severe usage to which they are subjected will very soon batter the timbers, much to their injury or entire destruction. For these reasons iron sills were adopted, thus producing a broad bearing-surface in one piece to rest upon the sills A, and a firm, unyielding support for the stamp-frame, sills, and the spring-timbers E. The metal weight of these sills D is about three tons each. These sills D support the whole machine with its frame-work, the metal weight of which is about thirty-two tons each. F are cross-timbers, about seventeen by twenty inches square, each end of which is secured at the outer ends of the metal sills D. G are cross-timbers about sixteen by eighteen inches square, the ends of which are secured firmly to the timbers F, about four feet equidistant from the center thereof. In the center of these timbers are secured perpendicular posts H, about eighteen inches square, which serve as supports for the stamp and its mechanism. These timbers or posts H are supported by braces I, the foot of each brace being firmly secured to the outer ends of the timber F, and the upper ends of these braces are firmly secured to the posts H. The spring-timbers (which are seven in number, and about thirteen by eighteen inches square) are skived off on the upper side from a point about eighteen inches each way from the center down to a thickness of about nine inches at their ends, and said timbers are arranged side by side between the sills F. J is a metallic bed-plate, of about ten tons weight, which, for convenience of transportation, may be made in two parts, and its shape may be understood from the drawings. It is of such size as to nearly fill the space between the timbers G and F, and has its bearing directly upon the spring-timbers E. The stamp-mortar (about ten tons weight) has its foundation upon the center of the bed-plate J, and the whole depth of the foundation-timbers will be about twelve feet. Heretofore only three spring-timbers, E, have been used to support the cast-iron bed upon which the mortar is secured, which timbers have proved insufficient for the work that is put upon them; consequently, in from six to nine months, they break

BEST AVAILABLE COPY and cause great damage in various ways. To avoid this difficulty, a greater number of timbers are substituted, and the bed is placed crosswise instead of lengthwise, as heretofore, which allows of four additional timbers, thus producing a broader and stouter foundation to support the mortar and the frame-work of the machine, and, at the same time, producing a greater spring-surface to sustain the blow of the hammer. The metal sill D is provided instead of timber sills because the former can be made of any desirable size, width, or shape, so as to secure a broader bearing-surface in one piece upon the foundation-timbers A, and also to more perfectly secure said sills D firmer upon the foundation-timbers A by means of bolts B. In Figs. 5 and 6, *a* is a stamp-mortar. *a'* is a mortar-box, two sides of which are perpendicular and parallel with each other. Flanges *a''* are formed on each of these parallel sides of this mortar or box, extending in a perpendicular direction, and near the center thereof, for the purpose of securing said mortar in an erect and firm position to the posts H, while the mortar itself rests upon the bed-plate J. This mortar-box, sides, top, and flanges are all made in one piece, of cast metal, and the inner sides and the under side of the top are lined with about half-inch metal plate. The top plate of the box is provided with apertures to receive the hoppers *a'''*, through which the material is introduced into the machine, and has also a central aperture, in which is secured a flanged bell-shaped necking, *d*, through which the shaft, with its stamp-head, may be introduced before putting the packing-ring in place, and while setting up the machine. The hoppers *a'''* are made of metal and lined with metal, so that the parts most liable to wear away may be easily and quickly relined, when necessary. The shape and proportion of these hoppers will be understood from the drawings. The aperture through which the shaft works is provided with a flanged bell-shaped necking, *d*, made in two parts, and secured together by flanges, and having a tubular-ring rim, *c*, and funnels *c'*. Said tubular-ring rim *c* is provided with perforations or jets at regular intervals on the inside, and near the bottom thereof. The object of these funnels *c'* and jets is to introduce a supply of water into said tubular rim, and thence through the orifices in a direction downward and toward the stamp-shaft, the object of which is to keep down the splash and supply the stamp with water. *d'* represents water-packing rings, fitted upon the inside flange of the necking *d*, and secured to the top plate of the box *a'*. Between these rings is secured a leather ring, *d''*, which projects inward nearly to the stamp-shaft, or so as to leave about an equal space around and between its edge and the side of said shaft, so as to allow a body or equal sheet of water to flow all around said shaft into the box, for the purpose of counteracting the splash or rising of the material produced from the action of the stamp-hammer. The opening of this leather ring is about the same size of the shaft at its highest point of altitude—that is, the inside diameter is nine inches, and the diameter of the shaft is eight inches, which allows half an inch play around the shaft; but the shaft, when elevated to its highest point, is nine inches in diameter in the ring, and nearly or quite fills the opening in the leather ring, and consequently the flow of water for the moment is checked until the shaft again drops, causing the splash to rise, when the accumulated supply of water, with the regular flow thereof, falls through the space between the leather ring and shaft, and counteracts the rising splash or material. In addition to this packing, is also secured a clamp-flange, L, to the shaft K, just above the necking, the object of which is to prevent or counteract any splash or gritty water that rises upward between the leather ring and the shaft, which will sometimes occur when the leather ring becomes worn. A metal ring, *h*, made in two parts, is provided, having an opening about twelve inches in diameter, and having its edge curved downward more or less, which ring is secured around the stamp-shaft opening on the under side of the top plate of the box *a'*, between said plate and the lining, the object of which is to break the greater portion of the splash from coming in contact with the leather ring and stamp-shaft.

*a* represents the mortar, which is made larger at or near the bottom than at the top, and the wall of which is lined with staves *e*, ten in number, more or less, which are made of corresponding shape, so that when they are all inserted in their place closely side by side around the ring of the hammer-block or anvil *e*, and the last stave, which is made of a wedge or dovetail shape, is inserted and drawn back to its place or position with the others against the wall of the mortar or pot by means of a bolt, *x*, it will bind the others closely in their respective places. The mortar die or bed, the shape of which will be clearly seen in Fig. 6, is slightly conical-shaped, and is of nearly the same diameter as the inside diameter of the ring *e''*. The staves are also made thicker at their lower ends than at their upper ends, the object of which is to prevent them from jumping upward out of place from the jar or working of the hammer-head. *f* represents sieves or gratings, through or against which the water or choice metal splashes, and escapes from the machine through the spout *g*. These perforated plates are secured in each side of the box-opening, (front and rear,) so as to be easily taken out and replaced, and are held by plates and screws at their upper ends. *f'* is a metal frame-work secured upon the outside of the mortar-box, (front and rear,) having grooves to receive the edges of the metal-splash plate. It is also supplied with a trough and spout at its lower side, which takes the wash from the machine into a receptacle arranged therefor. Without these plates the water with the mingling material would be thrown at each drop of the hammer through the grating in a perfect shower-bath into the open space where the machine is located. This mortar and box are secured loosely to the upright posts by means of bolts, which pass through the caps and posts, between which the flanges on the side of the mortar play or work.

In Fig. 7, K is a metal stamp-shaft, the head of which is about twenty-two inches in diameter, tapering, the first two feet from or above the head, from nine inches in diameter to eight inches in diameter. The whole length, above two feet from the head, is eight inches in diameter. This head is flattened on two sides equally sufficient to reduce it to fourteen inches in thickness from side to side.

K′ is the stamp hammer-head, the shape of which is about the same as that of the head to which it is secured. Its depth is about eight inches and a half. The outer edge of the hammer wears away faster than the center, and for this reason a depression is formed in the center of its face to produce even wear of the face of the hammer; but the hammer may be used without said depressions. This hammer is secured to the stamp-shaft head by a dovetail joint, one side of which is straight across from side to side of the head. The opposite side is curved, and both sides are cut under dovetailing, as shown in Fig. 9. Said dovetail formed on the hammer is smaller than the opening formed in the head for its reception, to permit the key to enter, and thereby firmly secure the hammer to the head. M is a frame-work or clamp, made in two parts, and secured together by bolts or screws, and fitted to the stamp-shaft, and having splines, which work in grooves formed in the shaft in the direction of its length. The office of this frame-work is to give a rotary motion to the shaft by means of a belt which runs upon the pulley $h'$, secured to said frame-work. The upper end of this stamp-shaft is secured to the outer end of the steam-cylinder piston-rod $i$ by means of a flange, $i'$, a bonnet, $i''$, and a flange at the top of the stamp-shaft, with fastening-bolts $i'''$, to secure the flanges together, and a collar, $j$, is secured to the piston-rod $i$ near its lower end, with an elastic washer or spring between the collar and the top of the bonnet, and a similar elastic washer is placed below the collar, between it and the top of the stamp-shaft, the upper washer being about two inches thick, and the lower one about four and a quarter inches in thickness. The lower end of the piston-rod is fitted loosely into a steel bushing secured in the upper end of the shaft K.

The manner of setting up this machine and putting it into operation will be clearly understood from the foregoing description.

The invention having been thus described, what is claimed as new is—

1. The combination of the bed-plate J, a series of spring-timbers E, and the metallic sills D, substantially as and for the purpose described.

2. The mortar $a$, of larger inside diameter near the bottom than at the top, combined with the staves $e'$, tapering in thickness from the bottom to the top, to conform to the shape of the mortar inside, substantially as described.

3. The combination of the circular or cylindrical mortar $a$ with the rectangular box $a'$, containing the screens $f$, said box $a'$ being placed upon and covering the whole side and top of the mortar, substantially as described.

4. The stamp-head having two opposite sides straight and parallel with each other, and the other two opposite sides made curved to conform to the circular form of the mortar, substantially as set forth.

5. The two-part ring $h$, secured beneath the top plate, and between it and the lining around the stamp-shaft opening, substantially as and for the purpose described.

6. The tubular urn-shaped ring-necking $d$, made in two parts, in combination with the top plate of the stamp-shaft opening, substantially as set forth.

7. The connection of the stamp-shaft K with the piston-rod $i$, by means of the flanges, bonnet $i''$, and collar $j$, and the interposed elastic washers or springs, substantially as set forth.

ADELIA E. BALL.
EDWIN P. BALL.

Witnesses:
CHAS. A. SHERMAN,
N. CUTLER.